July 7, 1959  A. KORN ET AL  2,894,259
RADIO LOCATIONS SYSTEMS
Filed May 31, 1952  2 Sheets-Sheet 1
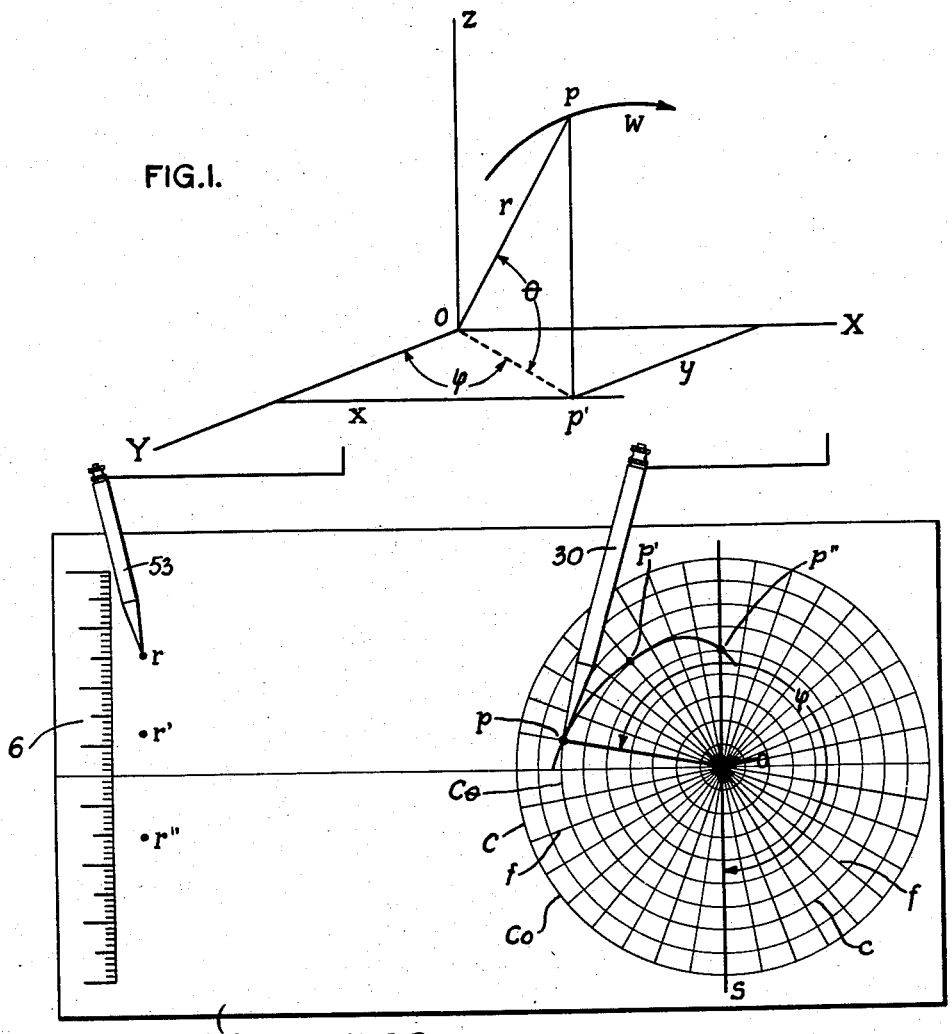
FIG.1.
FIG.2.
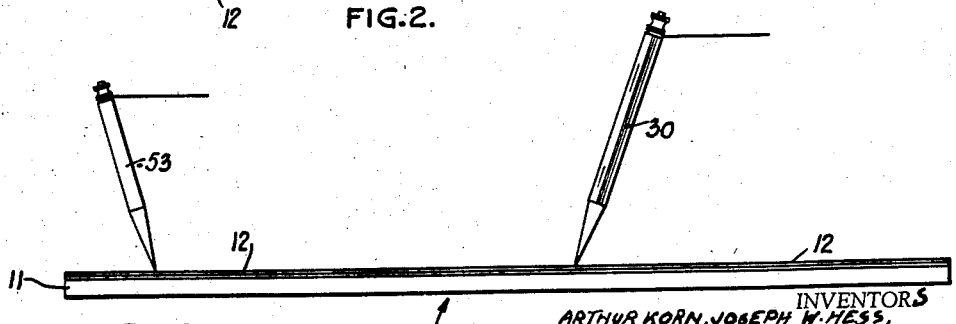
FIG.3.
INVENTORS
ARTHUR KORN, JOSEPH W. HESS
SIMON L. RUSKIN
BY
ATTORNEY July 7, 1959
A. KORN ET AL
2,894,259
RADIO LOCATIONS SYSTEMS
Filed May 31, 1952
2 Sheets-Sheet 2
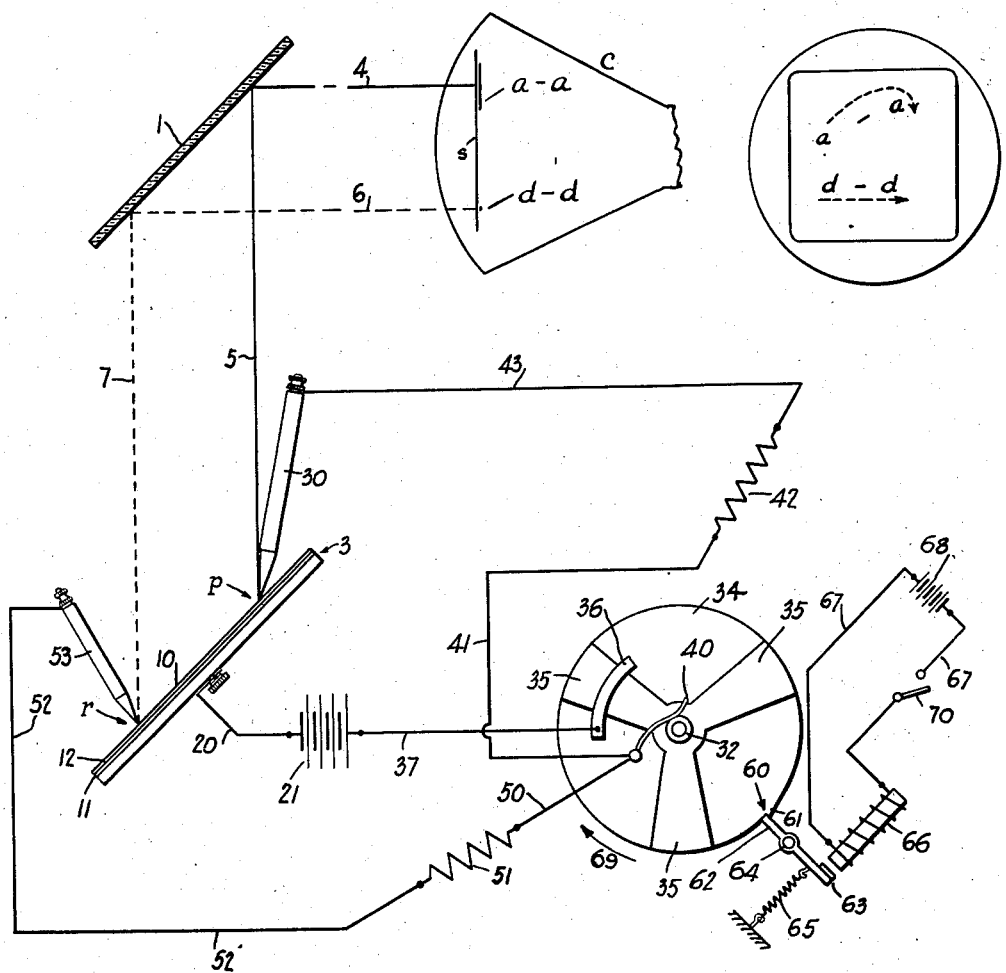
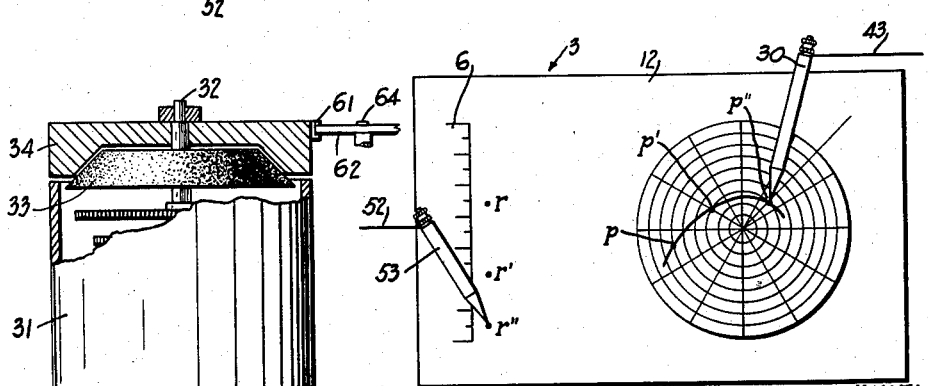
FIG. 5.
FIG. 6.
INVENTORS.
ARTHUR KORN, JOSEPH N. HESS
SIMON L. RUSKIN
BY
ATTORNEY United States Patent Office 2,894,259
Patented July 7, 1959

2,894,259
RADIO LOCATIONS SYSTEMS

Arthur Korn, deceased, late of Newark, N.J., by Elizabeth P. Korn, administratrix, Hoboken, N.J., and Joseph W. Hess, deceased, late of Hoboken, N.J., by Adele Hess, administratrix, Los Altos, Calif., and Simon L. Ruskin, New York, N.Y.; Dan Ruskin, Milton Reder, and Carol Fahri, executors of the estate of said Simon L. Ruskin, deceased Application May 31, 1952, Serial No. 292,756

7 Claims. (Cl. 343—11)

This invention relates to radio location systems and more particularly to a system for rapid evaluation and transformation into electrical signals, of the position of one or more cathode ray spots travelling over one or more fluorescent screens for example, in accordance with the movement, or coordinates or parameters of such movement, of an object to be located in space.

This is a continuation in part of our abandoned patent application Serial No. 760,588, filed July 12, 1947, and relating to radar space location chart etc., and 408,944 (now abandoned) filed August 31, 1941, relating to devices for determining the position of targets in motion.

One of the objects of this invention is a radio location system in which the fluorescent screen or screens of one or more cathode ray tubes are scanned to permit indication, visual or electrical, of the spot or spots such as corresponding to the position of a body to be located in space, and in which such indication or indications are transformed into visual and/or electrical signals of predetermined timing and/or intensity ready for further evaluation and transmission.

These and other objects of the invention will be more fully described in the drawings annexed or attached herewith in which:

Fig. 1 illustrates generally in a system of rectangular coordinates the mathematical connections between the main values used in the present invention for determining the changes in the position of a target in motion viz. the angles of directions and the distance of the observer to the target.

Fig. 2 shows in a plan view in enlarged scale a registration panel displaying two arrays of cathode ray spots reproduced from two cathode ray tubes and corresponding respectively to the direction points and of the distance points of a traveling target, brought into view and transformed into visually evaluable electrical signals in accordance with the invention.

Fig. 3 is a side view of the registration device illustrated in Fig. 2.

Fig. 4 is a schematic drawing of a device for producing a spot pattern such as shown in Figs. 2 and 3 in the form of visual marks at selected intervals representing the directions and distance points of the target.

Fig. 4a shows the changes in direction and distance as they are traced on adjacent sections of a common cathode tube screen.

Fig. 5 shows in cross section a periodic interrupter used in the device illustrated in Fig. 4 serving the purpose of marking the directions and distance points at selected intervals on the display panel of the device.

Fig. 6 shows in a plan view the display panel of the device according to the invention.

Referring to the drawings, X, Y, Z of Fig. 1 are the axes of a system of rectangular coordinates; $p$ a target, e.g., an aircraft, moving in space. O denotes the origin of the system of coordinates at which the observer is located; $r$ is the distance $Op$ of the target from the observer. $Op'$ is a projection of the distance $Op$ on the XY plane. The angle $\theta$ is the angle of elevation. The angle $\varphi$ is the angle between $Op'$ and the Y axis which may be for example the direction from the observer towards the southpoint (azimuth). The curve W through the point $p$ with the arrow illustrates the path of the moving target.

It is already known how one can determine by means of a radio locator at any given time $t$ the values $r$, $\theta$ and $\varphi$. In scientific terms radio locators are defined as radio apparatus of any kind serving for the location in space of objects such as airplanes. The principle of such radio locators is based upon the fact that an aircraft when flying in the field of an ultra-short wave transmitter is capable of reflecting waves directed thereto at varying angles of azimuth and elevation thereby indicating by its reflection from the target the elevation of the target for a given azimuth and that reflected waves obtained at an ultra-short wave receiver from a transmitter by reflection from an aircraft will arrive with a time interval (which will vary as the aircraft moves) with respect to the arrival of corresponding waves which have travelled direct from the transmitter to the receiver thereby indicating the distance of the target.

By means of such a radio locator it is also possible to find at any later moment $t'$ the values $r'$, $\theta$ and $\varphi$. With additional calculations one can find the corrections necessary for taking into account the motion of the target. This method is of no practical use because of the expenditure of time necessary for the calculations and the rapidity of the movements of the aircraft.

According to the invention, complicated calculations for the corrections necessitated by the motion of the target are avoided and a quick and readily evaluable measure of the rate of change in the movement of the target can be obtained.

It is known that one can cause to appear, by means of a radio locator and a known cathodic tube device, the image of a moving target as an illuminated point on a fluorescent screen of a cathodic tube. With the radio locator covering for every angle of azimuth, several angles of elevation, and the cathodic tube having a fluorescent screen scanned radially as well as circumferentially respectively in accordance with the azimuthal and elevational changes in direction of the radio locator, every value of $\theta$ and $\varphi$ in space there corresponds a certain point (direction point) on the screen. That is, one can recognize by the position of the illuminated point on the screen the direction of the target.

By means of a radio locator and another cathodic tube device one can in known manner also cause to appear an illuminated point representing the time interval between the transmitted and the reflected waves (distance point) on a narrow fluorescent screen scanned in perpendicular directions, along a measuring scale determined by the time intervals of the waves which have travelled directly from transmitter to receiver. By this arrangement one can recognize by the position of this point the distance of the target from the observer.

Thus one is enabled to obtain visual data for the direction and the distance of the moving target.

Under these assumptions, see Figs. 2 and 3, two different sequences of points appear upon the surface 3. One sequence $p, p', p'' \ldots$ represents the path $w$ shown in Figure 1 of the direction point. Another sequence $r, r' r'' \ldots$ represents, if measured on the linear measuring scale, the distance of the moving target from the observer.

In Fig. 4 the screen of a known cathodic tube device with its illuminated direction point $p$ is reflected from a mirror 1 onto a surface 3. The path of the light rays coming from the direction point is illustrated by the lines 4, 5. The screen with the linear measuring scale of the second cathodic tube, which as shown in Figs. 4 and 4a, may be arranged together with the first cathodic tube in the same envelope having a common fluorescent screen with two separate display sections, a—a and d—d, respectively, is also reflected from the mirror 1 on the surface 3 by the illuminated distance point 4. The path of these rays coming from the distance points is illustrated by the lines 6, 7.

In the example illustrated in Fig. 4, the surface 3 is a conducting plate, for instance, of aluminum or other metal. Plate 3 is connected to one pole of battery 21 by wire 20. Plate 3 carries interchangeably a foil 11, 12 consisting of one or several layers. This foil has such a structure, that by means of an electrode, for example, a metallic style 30, a visual mark is produced whenever an electrical current passes from the style 30 through foil 11, 12 on plate 3. In the example illustrated in Fig. 4 the foil consists of two layers. One layer 11 consists of conducting material such as a tin foil, the other layer 12 is of nonconducting material, for example, of fibrous material such as paper, upon which under the influence of the current passing from the pointed style 30, visual marks are produced. The layer 12 can also consist of fibrous material impregnated with a proper chemical solution changing its color under the influence of the electrical current below the point of style 30. The arrangement and structure of the before mentioned auxiliary device can be changed. It is only essential that by this device persisting visual marks can be produced upon the foil below the positions of style 30 at determined periods.

According to the example of the invention illustrated in the Figs. 2, 3, 4 a second metallic style 53 is provided, which is capable of sliding with its point on surface 3. This style 53 may also produce persisting visual marks on the surface of the foil along the linear measuring scale, Fig. 2. The production of these visual marks at determined periods by styles 30 and 53 can be attained by different devices. In the example illustrated in the Figs. 4 and 5 the following device is provided.

Casing 31, Fig. 5, contains a clockwork, not shown in the drawing, the driving mechanism of which is provided with a shaft 32. Shaft 32 has attached thereto a conical disk 33 of a friction clutch. Over disc 33 there is arranged another disc 34 having a conical recess. Disc 34 is arranged loose on the shaft 32 and is coupled with the clockwork by the friction clutch if it is not retained by an obstacle. (See 61, 62, Fig. 4.)

The disc 34 is of non-conducting material and provided on its surface with one or several conducting segments 35. The segments are arranged at equal distances from one another. On the surface of disc 34 slides a contact 36 connected by wire 37 with the pole of battery 21 opposite to the above mentioned pole. Shaft 32 is connected with conducting segments 35. Against shaft 32 slides a contact 40 connected through wire 41, resistance 42 and wire 43 to style 30. Contact 40 is further connected through wire 50, resistance 51 and wire 52 to style 53.

Disc 34 is provided with a stopping device 60, which forms the above mentioned obstacle to the movement of disc 34. This stopping device comprises a cam 61 and a two arm lever 62, 63 which swings around pivot 64. Arm 62 is pressed by spring 65 against cam 61. The other arm 63 is attracted by an electro magnet 66 inserted in the circuit 67 of a battery 68 when the interrupter 70 is closed. If stopping device 60 is released, disc 34 with conducting segments 35 is moved in the direction of arrow 69 shown in Fig. 4.

For the observing, recording and evaluating of the aforesaid data, the following method is used:

At first by means of the radio locator and the cathodic tube devices the images of the moving target are produced in known manner. These, as described before, appear on the surface 3, as direction point $p$ and distance point $r$.

At this moment the style 30 is placed on point $p$, the style 53 on the point $r$ and the interrupter 70, Fig. 4, is closed. Now one follows with style 30 the path $w$ of point $p$ and with style 53 the path of point $r$ along the linear measuring scale. Every time contact 36, Fig. 4, slides over one of the conducting segments 35, the circuits through styles 30, 53 and foil layers 11, 12 are closed. In this way at predetermined periods permanent visual marks $p, p'\ p'' \ldots$ and $r, r'\ r'' \ldots$ are produced on layer 12.

With the device described above it is possible to evaluate the rate of change in distance and direction of a moving target, i.e. the speed of the movement of the target, for the purpose, for example, to facilitate direction of a gun following the target.

For the evaluation of these changes it is advisable to use besides the linear measuring scale for the distance point $r$, a system of polar coordinates for the direction point $p$. This system, Fig. 2, consists of a plurality of concentric circles $c$ and straight lined radii or directions $f$, passing through center O. To each circle $c$ corresponds a value of $\theta$. The circle $C_0$ is the circle corresponding to the horizon. The circle $C_\theta$ is the circle passing through point $p$, the radius of which corresponds to the value $90° - \theta \ldots$ To each direction $f$ corresponds a value of $\varphi$. For direction OS, Fig. 2, directed toward the south point $\varphi$ is O. Direction O$p$ forms with direction OS the angle $\varphi$. It is therefore possible to read in this diagram the values $(\theta, \varphi); (\theta', \varphi'); (\theta'', \varphi'')$ for the points $p, p', p'' \ldots$ By means of this system of polar coordinates one can read immediately also the value of the differences $(\theta' - \theta), (\theta'' - \theta'), (\varphi' - \varphi), (\varphi'' - \varphi') \ldots$ The values of these differences can be used with known methods for giving the rates of change of the various parameters, corresponding to the movement of the target.

The rate of change of distance can be calculated in an analogous way as the change of direction in the following way:

To each distance point $r$ corresponds a distance $r$ from the origin of the linear measuring scale; to the point $r'$ corresponds the distance $r'$ from the origin and to the point $r''$ the distance $r''$. From the values of the difference $r' - r, r'' - r' \ldots$, can be found in known manner the rate of change of the distance of the target.

What is claimed is:

1. In a radio location system, at least one cathode ray tube, means for controlling a cathode ray to produce at least one fluorescent screen spot corresponding to the object to be located in space, means including a picture of said screen for continuously following the screen spot to permit permanent indication of the position of said spot, and means under control of time for rhythmically varying the condition of the picture surface to cause said permanent indications at periodic intervals only, thereby to permit evaluation of the movement of said object in terms of said variations.

2. In a system according to claim 1, means for projecting the cathode ray screen onto another surface, and said following means including means for following the screen spot on said other surface and said condition varying means including means for rhythmically varying the condition of said other surface.

3. In a system according to claim 1, manual means for following said screen spot.

4. In a system according to claim 1, means for projecting the cathode ray screen picture onto another screen, said screen including a less conductive layer superimposed upon a more conductive layer, and said scanning means including a source of electrical energy and a pointed conductor in contact with at least one of said layers and connected with said energy source to produce at said spot visual indications, and means for rhythmically interrupting said energy source to produce said indications at predetermined time intervals only.

5. In a radio location system, at least one cathode ray tube means for controlling the cathode ray to produce at least one fluorescent screen spot corresponding to the object to be located in space, means including a picture of said screen for following the screen spot, including means under control of time for rhythmically marking said screen spot to permit permanent indication of the position of said spot, a source of electrical energy, and means for periodically varying said energy under control of said following movement for permitting transmission of said indications in the form of electrical signals.

6. In a system according to claim 5, manual means for scanning said screen spot.

7. In a radio location system, at least one cathode ray tube, means for controlling a cathode ray to produce at least one fluorescent screen spot corresponding to the object to be located in space, means for continuously following said screen spot including means for marking its position and means under control of time for rhythmically disabling and enabling said marking means thereby to cause markings to occur at predetemined time intervals only thereby to permit evaluation of the movement of said object in terms of the rhythm of said markings.

References Cited in the file of this patent

UNITED STATES PATENTS

| | | |
|---|---|---|
| 1,865,610 | Blair | July 5, 1932 |
| 2,430,283 | Epstein | Nov. 4, 1947 |
| 2,433,860 | McDowell | Jan. 6, 1948 |
| 2,522,528 | McNally | Sept. 19, 1950 |
| 2,528,142 | Herzlinger | Oct. 31, 1950 |
| 2,585,855 | Sherwin | Feb. 12, 1952 |
| 2,617,094 | Tinus | Nov. 4, 1952 |